United States Patent
Mentink et al.

(10) Patent No.: US 8,916,628 B2
(45) Date of Patent: Dec. 23, 2014

(54) THERMOPLASTIC COMPOSITIONS BASED ON SOLUBLE STARCH AND METHOD FOR PREPARING SUCH COMPOSITIONS

(75) Inventors: Leon Mentink, Lille (FR); Didier Lagneaux, Bluffy (FR); Jerome Gimenez, Villeurbanne (FR)

(73) Assignee: Roquette Freres, Lestrem (FR)

( * ) Notice: Subject to any disclaimer, the term of this patent is extended or adjusted under 35 U.S.C. 154(b) by 628 days.

(21) Appl. No.: 12/864,510

(22) PCT Filed: Jan. 29, 2009

(86) PCT No.: PCT/FR2009/050130
§ 371 (c)(1),
(2), (4) Date: Jul. 26, 2010

(87) PCT Pub. No.: WO2009/095617
PCT Pub. Date: Aug. 6, 2009

(65) Prior Publication Data
US 2010/0305271 A1    Dec. 2, 2010

(30) Foreign Application Priority Data

Feb. 1, 2008 (FR) ..................................... 08 50657

(51) Int. Cl.
| | | |
|---|---|---|
| *C08B 37/00* | (2006.01) |
| *C08L 3/02* | (2006.01) |
| *C08L 5/16* | (2006.01) |
| *C08G 18/76* | (2006.01) |
| *C08G 18/08* | (2006.01) |
| *C08G 18/64* | (2006.01) |
| *C08L 75/04* | (2006.01) |
| *C08K 5/29* | (2006.01) |
| *C08L 3/04* | (2006.01) |

(52) U.S. Cl.
CPC ........ *C08G 18/7657* (2013.01); *C08G 18/0895* (2013.01); *C08G 18/6484* (2013.01); *C08L 3/02* (2013.01); *C08L 75/04* (2013.01); *C08K 5/29* (2013.01); *C08L 3/04* (2013.01)
USPC .................................. 524/48; 524/47; 524/54

(58) Field of Classification Search
USPC ................................. 524/47, 48, 54
See application file for complete search history.

(56) References Cited

U.S. PATENT DOCUMENTS

| 5,106,890 A * | 4/1992 | Maruhashi et al. ............. 524/47 |
| 6,011,092 A * | 1/2000 | Seppala et al. .................. 524/47 |
| 6,821,588 B1 * | 11/2004 | Hammer et al. ............. 428/34.8 |
| 7,485,689 B2 * | 2/2009 | Stevens et al. ................ 527/300 |

FOREIGN PATENT DOCUMENTS

| DE | 4419572 A1 | 11/1995 |
| FR | 2640274 A1 | 6/1990 |
| WO | 97/03120 A1 | 1/1997 |
| WO | 2004/005365 A1 | 1/2004 |

OTHER PUBLICATIONS

Long Yu et al: "Green Polymeric Blends and Composites from Renewable Resources", Macromolecular Symposia, 2007, pp. 535-539, vol. 249-250, XP002491909.

* cited by examiner

*Primary Examiner* — Michael L Leonard
(74) *Attorney, Agent, or Firm* — Young & Thompson

(57) ABSTRACT

A novel starch-based composition includes: (a) at least 45% by weight of at least one soluble starch, (b) at most 55% by weight of at least one non-biodegradable, non-amylaceous polymer, and (c) a bonding agent carrying at least two functional groups capable of reacting with molecules carrying functions including an active hydrogen, these amounts being expressed with respect to solids and relative to the sum of (a) and (b). A method for preparing such a starch-based composition and a thermoplastic composition prepared by heating such a composition are also described.

8 Claims, No Drawings

THERMOPLASTIC COMPOSITIONS BASED ON SOLUBLE STARCH AND METHOD FOR PREPARING SUCH COMPOSITIONS

The present invention relates to novel starch-based compositions and thermoplastic starchy compositions obtained from the latter, and also to the methods of preparing these compositions.

The expression "thermoplastic composition" is understood within the present invention to mean a composition which, reversibly, softens under the action of heat and hardens by cooling. It has at least one glass transition temperature ($T_g$) below which the amorphous fraction of the composition is in the brittle glassy state, and above which the composition may undergo reversible plastic deformations. The glass transition temperature or at least one of the glass transition temperatures of the starch-based thermoplastic composition of the present invention is preferably between −50° C. and 150° C. This starch-based composition may, of course, be formed by processes conventionally used in plastics processing (extrusion, injection molding, molding, blow molding, calendering, etc.). Its viscosity, measured at a temperature of 100° C. to 200° C., is generally between 10 and $10^6$ Pa·s.

Preferably, said composition is "thermofusible", that is to say that it can be formed without application of high shear forces, that is to say by simple flowing or simple pressing of the molten material. Its viscosity, measured at a temperature of 100° C. to 200° C., is generally between 10 and $10^3$ Pa·s.

Within the meaning of the invention, the expression "soluble starch" is understood to mean any starch-derived polysaccharidic material having, at 20° C., a fraction that is soluble in a solvent chosen from demineralized water, ethyl acetate, propyl acetate, butyl acetate, diethyl carbonate, propylene carbonate, dimethyl glutarate, triethyl citrate, dibasic esters, dimethyl sulfoxide (DMSO), dimethyl isosorbide, glyceryl triacetate, isosorbide diacetate, isosorbide dioleate and the methyl esters of plant oils, at least equal to 5% by weight. This soluble fraction is preferably greater than 20% by weight and in particular greater than 50% by weight. Of course, the soluble starch may be completely soluble in one or more of the solvents indicated above (soluble fraction=100%).

The soluble starch is used according to the invention in solid, preferably essentially anhydrous form, that is to say it is not dissolved in an aqueous or organic solvent. It is therefore important not to confuse, throughout the description that follows, the term "soluble" with the term "dissolved".

The expression "plasticizer of the starch" is understood to mean any molecule, preferably an organic molecule, of low molecular weight, that is to say preferably having a molecular weight of less than 5000, in particular less than 1000, which, when it is incorporated into the starch via a thermomechanical treatment at a temperature between 20 and 200° C., results in a decrease of the glass transition temperature and/or a reduction of the crystallinity of this starch. In the case of a soluble starch within the meaning of the invention, generally that is poorly crystalline, the incorporation of the plasticizer leads to a disappearance of a possible residual crystallinity and to a completely amorphous state being obtained. The plasticizer preferably does not include water.

The expression "non-biodegradable, non-starchy polymer" is understood to mean any organic polymer other than starch or starch derivatives, considered to be non-biodegradable or non-compostable within the meaning of the EN 13432, ASTM D6400 and ASTM 6868 standards.

This non-biodegradable, non-starchy polymer does not, in particular, include natural polymers extracted from plants, from animal tissues or from microorganisms, polyvinyl alcohol and biodegradable polyesters such as polylactic acid (PLA), polycaprolactones (PCLs), polybutylene succinate adipates (PBSAs), polybutylene adipate terephthalates (PBATs), polyhydroxyalkanoates (PHAs), in particular polyhydroxybutyrates (PHBs) and polyhydroxybutyrate-co-hydroxyvalerates (PHBVs).

Preferably, the non-biodegradable, non-starchy polymer bears functional groups having an active hydrogen, that is to say functional groups having at least one hydrogen atom capable of being displaced if a chemical reaction takes place between the atom bearing this hydrogen atom and another reactive functional group. Functional groups having an active hydrogen are, for example, hydroxyl, protonic acid, urea, urethane, amide, amine or thiol functional groups. This definition also encompasses, in the present invention, any non-biodegradable, non-starchy polymer bearing functional groups capable of giving, especially via hydrolysis, such functional groups having an active hydrogen. The functional groups that can give, especially via hydrolysis, such functional groups having an active hydrogen are, for example, alkoxy functional groups, in particular alkoxysilanes, or acyl chloride, acid anhydride, epoxide or ester functional groups.

The expression "coupling agent" is understood to mean any molecule bearing at least two free or masked functional groups capable of reacting with molecules bearing functional groups having an active hydrogen such as, in particular, starch macromolecules. This coupling agent consequently enables, by formation of covalent bonds, the bridging of at least one part of the soluble starch macromolecules to one another and optionally with the non-biodegradable, non-starchy polymer present in the composition. When the composition contains a plasticizer bearing functional groups having an active hydrogen, the coupling agent is advantageously capable of reacting with this plasticizer in order to attach it to the starch and/or to the non-biodegradable, non-starchy polymer. This coupling agent differs from adhesion agents, physical compatibilizing agents or grafting agents by the fact that the latter either only create weak bonds (non-covalent bonds), or only bear a single reactive functional group.

In the current context of climate changes due to the greenhouse effect and to global warming, of the upward trend in the costs of fossil raw materials, in particular of oil from which plastics are derived, of the state of public opinion in search of sustainable development, more natural, cleaner, healthier and more energy-efficient products, and of the change in regulations and taxations, it is necessary to provide novel compositions derived from renewable resources, which are suitable, in particular, for the field of plastics, and which are simultaneously competitive, designed from the outset to have only few or no negative impacts on the environment, and technically as high-performance as the polymers prepared from raw materials of fossil origin.

Starch constitutes a raw material that has the advantages of being renewable, biodegradable and available in large amounts at an economically advantageous price compared to oil and gas, used as raw materials for current plastics.

The biodegradable nature of starch has already been exploited in the manufacture of plastics, in accordance with two main technical solutions.

The first starch-based compositions were developed around thirty years ago. The starches were then used in the form of mixtures with synthetic polymers such as polyethylene, as filler, in the native granular form. Before dispersion in the synthetic polymer constituting the matrix, or continuous phase, the native starch is preferably dried to a moisture content of less than 1% by weight, in order to reduce its hydrophilic nature. For this same purpose, it may also be coated with fatty substances (fatty acids, silicones, siliconates) or else be modified at the surface of the grains with siloxanes or isocyanates.

The materials thus obtained generally contained around 10%, at the very most 20% by weight of granular starch, because beyond this value, the mechanical properties of the composite materials obtained became too imperfect and reduced compared to those of the synthetic polymers forming the matrix. Furthermore, it appeared that such polyethylene-based compositions were only biofragmentable and not biodegradable as anticipated, so that the expected boom of these compositions did not take place. In order to overcome the lack of biodegradability, developments were also subsequently carried out along the same principle but by only replacing the conventional polyethylene with oxidation-degradable polyethylenes or with biodegradable polyesters such as polyhydroxybutyrate-co-hydroxyvalerate (PHBV) or polylactic acid (PLA). Here too, the mechanical properties of such composites, obtained by mixing with granular starch, proved to be insufficient. Reference may be made, if necessary, to the excellent book "La Chimie Verte" [Green Chemistry], Paul Colonna, Editions TEC & DOC, January 2006, chapter 6 entitled "Matériaux à base d'amidons et de leurs dérivés" [Materials based on starches and on their derivatives] by Denis Lourdin and Paul Colonna, pages 161 to 166.

Subsequently, starch was used in an essentially amorphous and thermoplastic state. This state is obtained by plasticization of the starch with the aid of a suitable plasticizer incorporated into the starch in an amount generally between 15 and 25% relative to the granular starch, by supplying mechanical and thermal energy. The U.S. Pat. No. 5,095,054 by Warner Lambert and EP 0 497 706 B1 by the applicant describe, in particular, this destructured state, having reduced or absent crystallinity, and means for obtaining such thermoplastic starches.

However, the mechanical properties of the thermoplastic starches, although they can be adjusted to a certain extent by the choice of the starch, of the plasticizer and of the usage level of the latter, are overall quite mediocre since the materials thus obtained are still very highly viscous at high temperature (120° C. to 170° C.) and very frangible, too brittle and very hard and not very film forming at low temperature, that is to say below the glass transition temperature or the highest glass transition temperature.

Thus, the elongation at break of such thermoplastic starches is very low, always below around 10%, even with a very high plasticizer content of the order of 30%. By way of comparison, the elongation at break of low-density polyethylenes is generally between 100 and 1000%.

Furthermore, the maximum tensile strength of thermoplastic starches decreases very greatly when the level of plasticizer increases. It has an acceptable value, of the order of 15 to 60 MPa, for a plasticizer content of 10 to 25%, but reduces in an unacceptable manner above 30%.

Therefore, these thermoplastic starches have been the subject of numerous research studies aiming to develop biodegradable and/or water-soluble formulations having better mechanical properties by physical mixing of these thermoplastic starches, either with polymers of oil origin such as polyvinyl acetate (PVA), polyvinyl alcohols (PVOHs), ethylene/vinyl alcohol copolymers (EVOHs), biodegradable polyesters such as polycaprolactones (PCLs), polybutylene adipate terephthalates (PBATs) and polybutylene succinate adipates (PBSs), or with polyesters of renewable origin such as polylactic acids (PLAs) or microbial polyhydroxyalkanoates (PHA, PHB and PHBV), or else with natural polymers extracted from plants or from animal tissues. Reference may again be made to the book "La Chimie Verte" [Green Chemistry], Paul Colonna, Editions TEC & DOC, pages 161 to 166, but also, for example, to patents EP 0 579 546 B1, EP 0 735 104 B1 and FR 2 697 259 by the applicant which describe compositions containing thermoplastic starches.

Under a microscope, these biodegradable resins appear to be very heterogeneous and have large islands of plasticized starch in a continuous phase of synthetic polymers. This is due to the fact that the thermoplastic starches are very hydrophilic and are consequently not very compatible with the synthetic polymers. It results therefrom that the mechanical properties of such mixtures, even with addition of compatibilizing agents such as, for example, copolymers comprising hydrophobic units and hydrophilic units alternately, such as ethylene/acrylic acid copolymers (EAAs), or else cyclodextrins or organosilanes, remain quite limited.

By way of example, the commercial product MATER-BI of Y grade has, according to the information given by its manufacturer, an elongation at break of 27% and a maximum tensile strength of 26 MPa. Consequently, these composites today find restricted uses, that is to say uses limited essentially to the sole sectors of overwrapping, garbage bags, checkout bags and bags for certain rigid bulky objects that are biodegradable.

The destructuring of the semicrystalline native granular state of the starch in order to obtain thermoplastic amorphous starches can be carried out in a barely hydrated medium via extrusion processes. Obtaining a molten phase from starch granules requires not only a large supply of mechanical energy and of thermal energy but also the presence of a plasticizer or else risks carbonizing the starch.

Such plasticizers may be sugars, polyols or other low molecular weight organic molecules.

The amount of energy to be applied in order to plasticize the starch may advantageously be reduced by increasing the amount of plasticizer. In practice, the use of a plasticizer at a high level compared to the starch induces, however, various technical problems, among which mention may be made of the following:

a release of the plasticizer from the plasticized matrix from the end of the manufacture or during the storage time, so that it is impossible to retain an amount of plasticizer that is as high as desired and consequently to obtain a sufficiently flexible and film-forming material;

great instability of the mechanical properties of the plasticized starch which cures or softens as a function of the atmospheric moisture, respectively when its water content decreases or increases;

the whitening or opacification of the surface of the composition by crystallization of the plasticizer used at high dose, such as for example in the case of xylitol;

a tacky or oily nature of the surface, as in the case of glycerol for example;

a very poor water resistance, even more problematic when the plasticizer content is high. A loss of physical integrity is observed in water, so that the plasticized starch cannot, at the end of manufacture, be cooled by immersion in a bath of water as for conventional polymers. Therefore, its uses are very limited. In order to extend its usage possibilities, it is necessary to mix it with large amounts, generally greater than or equal to 60%, of polyesters or of other expensive polymers; and a possible premature hydrolysis of the polyesters (PLA, PBAT, PCL, PET) optionally associated with the thermoplastic starch.

The present invention provides an effective solution to the problems mentioned above.

One subject of the present invention is firstly a starch-based composition comprising:
(a) at least 45% by weight of at least one soluble starch;
(b) at most 55% by weight of at least one non-biodegradable, non-starchy polymer; and
(c) a coupling agent bearing at least two functional groups capable of reacting with molecules bearing functional groups having an active hydrogen,
these amounts being expressed as dry matter and related to the sum of (a) and (b).

Another subject of the present invention is a method for preparing a starch-based composition as described above. This method comprises the following steps:
(i) selection of at least one soluble starch (a);
(ii) incorporation, into this soluble starch (a), of a non-biodegradable, non-starchy polymer (b) in an amount such that the soluble starch (a) represents at least 45% by weight and the non-biodegradable, non-starchy polymer (b) represents at most 55% by weight, these amounts being expressed as dry matter and related to the sum of (a) and (b); and
(iii) incorporation, into the composition thus obtained, of at least one coupling agent bearing at least two functional groups capable of reacting with molecules bearing functional groups having an active hydrogen,
the step (ii) possibly being carried out before, during or after step (iii), that is to say after an intermediate storage of the compositions obtained at the end of one or the other of these steps.

The method of the invention preferably comprises the drying of the composition obtained in step (ii), before the incorporation of the coupling agent, to a residual moisture content of less than 5%, preferably less than 1%, and in particular less than 0.1% by weight. Depending on the amount of water to be eliminated, this drying step may be carried out in batches or continuously during the method.

The starch-based compositions obtained by this method contain the various ingredients, namely the starch, the non-biodegradable, non-starchy polymer, the coupling agent and optionally the plasticizer, intimately mixed with one another. In these compositions, the coupling agent has, in principle, not yet reacted with the other ingredients bearing functional groups having an active hydrogen.

These starch-based compositions are then used to prepare compositions in which at least one portion of the coupling agent has reacted with the starch and/or the non-biodegradable, non-starchy polymer and optionally with the plasticizer. It is this coupling of the various ingredients together which gives the thermoplastic starchy compositions of the present invention the advantageous properties that are subsequently specified.

The applicant wishes simply to emphasize here that, although the two types of compositions of the present invention (before and after reaction of the coupling agent) contain starch and have a thermoplastic nature, the compositions before reaction of the coupling agent will be referred to hereinbelow systematically as "starch-based compositions" whereas the compositions obtained by heating of the latter and that contain the reaction product of the coupling agent, of the starch and/or the non-biodegradable, non-starchy polymer, and optionally of the plasticizer will be referred to as "thermoplastic compositions" or "thermoplastic starchy compositions".

Another subject of the present invention is therefore a method for preparing such a "thermoplastic starchy composition" comprising the heating of a starch-based composition, as defined above, to a sufficient temperature and for a sufficient duration in order to react the coupling agent with the soluble starch (a) and/or the non-biodegradable, non-starchy polymer (b), and also a thermoplastic starchy composition capable of being obtained by such a method.

The two types of compositions mentioned above (before and after reaction of the coupling agent) have a structure of "solid dispersion" type. In other words, the compositions of the present invention, despite their high starch content, contain this starch in the form of domains dispersed in a continuous polymer matrix. This dispersion type structure should be distinguished, in particular, from a structure where the starch and the non-starchy polymer would be perfectly miscible or compatible with each other, or else compositions containing two co-continuous networks of starch and of polymer. The objective of the present invention is not in fact to prepare biodegradable materials but biosourced plastics with a high starch content that have excellent rheological and mechanical properties.

To the best knowledge of the applicant, such soluble starches have not, as such, been the subject of significant studies for the development of thermoplastic compositions, or only very few. This was due to an unfavorable and widespread prejudice, according to which the mechanical properties thereof and the water resistances thereof would necessarily be particularly mediocre.

Preferably, the starch-based composition comprises at least 49% by weight of at least one soluble starch (a) and at most 51% by weight of at least one non-biodegradable, non-starchy polymer (b).

The amount of soluble starch (a), expressed as dry matter and related to the sum of (a) and (b), is advantageously between 51% and 99.8% by weight, preferably between 55% and 99.5% by weight, and in particular between 60% and 99% by weight, the ideal being an even greater amount, possibly even attaining 70%.

Fillers and other additives, explained in detail hereinbelow, may be incorporated into the starch-based compositions of the present invention. Although the proportion of these additional ingredients can be quite high, the total amount of the sum of soluble starch (a) and of non-biodegradable, non-starchy polymer (b) of the starch-based compositions, expressed dry, is at least equal to 25%, preferably at least equal to 30% and more preferably at least equal to 40% by weight of the dry matter thereof.

The total amount of non-biodegradable, non-starchy polymer(s) (b) is preferably between 0.1% and 49%, in particular between 0.2% and 45% and better still between 1% and 40%, these values being expressed as dry matter and related to the sum of (a) and (b).

It should be noted that the applicant has observed after numerous studies that, surprisingly, the presence of a coupling agent advantageously improved the properties of the thermoplastic composition and that moreover, against all expectation, owing to the use of a coupling agent, the final thermoplastic composition obtained had a very good resistance to water and to steam, while remaining sufficiently flexible and truly thermoplastic within the meaning of the present invention.

The amount of coupling agent depends, in particular, on the type of soluble starch used. This amount, expressed as dry matter and related to the sum of (a) and (b), is preferably between 0.1% and 15% by weight, preferably between 0.1% and 12% by weight, better still between 0.2% and 9% by weight and in particular between 0.5% and 5% by weight. This amount of coupling agent is for example between 0.5% and 3% by weight.

The molecular weight of the coupling agent is preferably less than 5000 and in particular less than 1000. Indeed, the low molecular weight of the coupling agent favors its rapid and easy incorporation into the starch composition plasticized by the plasticizer. Preferably, the coupling agent has a molecular weight between 50 and 500, in particular between 90 and 300.

Against all expectation, very small amounts of coupling agent considerably reduce the sensitivity to water and to steam of the final thermoplastic composition obtained according to the invention and therefore make it possible, in particular, to cool this composition rapidly at the end of manufacture by immersion in water, which is not possible without the use of a coupling agent capable of forming bonds between the soluble starch molecules and between these and the non-starchy polymer.

The coupling agent may be chosen, for example, from compounds bearing at least two identical or different, free or masked, functional groups, chosen from isocyanate, carbamoylcaprolactam, epoxide, halogen, protonic acid, acid anhydride, acyl halide, oxychloride, trimetaphosphate, and alkoxysilane functional groups. It may advantageously be the following compounds:

- diisocyanates and polyisocyanates, preferably 4,4'-dicyclohexylmethane diisocyanate (H12MDI), methylene diphenyl diisocyanate (MDI), toluene diisocyanate (TDI), naphthalene diisocyanate (NDI), hexamethylene diisocyanate (HMDI) and lysine diisocyanate (LDI);
- dicarbamoylcaprolactams, preferably 1,1'-carbonylbiscaprolactam;
- diepoxides;
- compounds comprising an epoxide functional group and a halogen functional group (=halohydrins), preferably epichlorohydrin;
- organic diacids, preferably succinic acid, adipic acid, glutaric acid, oxalic acid, malonic acid, maleic acid and the corresponding anhydrides;
- oxychlorides, preferably phosphorus oxychloride;
- trimetaphosphates, preferably sodium trimetaphosphate;
- alkoxysilanes, preferably tetraethoxysilane, and any mixtures of these compounds.

In one preferred embodiment of the invention, the coupling agent is a diisocyanate, in particular methylene diphenyl diisocyanate (MDI) and 4,4'-dicyclohexylmethane diisocyanate (H12MDI).

The use of diisocyanates in the presence of starch and of non-starchy polymers has, certainly, already been described but under conditions and for purposes very different from those of the present invention. The non-starchy polymers were generally biodegradable polymers that did not make it possible, for high starch contents, to obtain thermoplastic compositions having the same performances as those of the present invention.

Thus, international application WO 97/03120 describes the preparation of starch derivatives by grafting of biodegradable polyesters (polylactic acid and polycaprolactone) via diisocyanates. The biodegradable compositions obtained are completely single-phase compositions, the starch having been rendered totally compatible with the grafted biodegradable polyester.

The article by Yu et al., entitled *Green Polymeric Blends and Composites from Renewable Resources*, Macromol. Sym. 2007, 249-250, 535-539, discloses the preparation of biodegradable materials by extrusion of a mixture of gelatinized starch and of biodegradable polyesters (PLA, PCL and PBSA) containing methylene diisocyanate introduced either as a mixture with the starch or as a mixture with the biodegradable polyester. The starch proportion of the compositions is significantly lower than those of the compositions of the present invention.

Application FR 2 640 274 describes the preparation of a film of polyvinyl alcohol and starch. During the preparation of the film, a crosslinking agent comprising at least two functional groups capable of reacting with the hydroxyl groups of the starch and of the PVA may be added to the composition. PVA, a biodegradable polymer, does not however make it possible to obtain materials that have the rheological properties of the present invention, nor the high stability thereof with respect to water.

International application WO 2004/005365 describes rigid polyisocyanurate foams obtained by reacting a composition containing an aromatic polyester polyol, a polyisocyanate, a carbohydrate having a molecular weight of less than 2000 and a blowing agent. The only application example using a soluble starch is example 11 in which a maltodextrin (Maltrin M150) is used in an amount of a few percent only.

None of the above documents describes nor suggests a thermoplastic composition similar to that of the present invention comprising a reactive, at least bifunctional, coupling agent in a composition comprising a sizeable fraction of a soluble starch and a non-biodegradable, non-starchy polymer having rheological and mechanical properties and also water resistance that are comparable to those of the present invention.

The soluble starch according to the invention is a polysaccharide material derived from starch, especially from granular starches, by virtue of a suitable solubilisation treatment of physical, chemical and/or enzymatic nature. In the native state, that is to say as naturally present in the reserve tissues and organs of higher plants, the starches are in a form that is virtually insoluble in water and organic solvents due to the semicrystalline granular structure thereof. Indeed, the solubles content thereof in demineralized water or in organic solvents is always considerably below 5%. The semicrystalline state within starch granules is essentially due to the amylopectin and the degree of crystallinity generally varies from 15 to 45%, essentially as a function of the botanical origin of the starch. Native granular starch, placed under polarized light, has, under a microscope, a characteristic black cross known as a "Maltese cross", typical of the crystalline granular state. For a more detailed description of granular starch, reference could be made, if necessary, to chapter II entitled "Structure et morphologie du grain d'amidon" [Structure and morphology of the starch grain] by S. Perez, in the work "Initiation à la chimie et à la physicochimie macromoléculaires" [Introduction to macromolecular chemistry and physical chemistry], first edition 2000, Volume 13, pages 41 to 86, Groupe Francais d'Etudes et d'Applications des Polyméres [French Group of Polymer Studies and Applications].

The solubilisation treatment of the starch is usually accompanied by a significant reduction of the crystallinity due to the amylopectin. Therefore, the starch that is soluble within the meaning of the invention may be in the form of granules, but the granules then appear with no Maltese cross visible under polarized light. In any case, the degree of amylopectin crystallinity of the soluble starch is therefore always below 15% and preferably in the vicinity of 0%.

Furthermore, this soluble starch generally has a weight-average molecular weight between 500 and $10^7$ daltons, preferably between 800 and 500 000 daltons and in particular between 2000 and 500 000 daltons.

The soluble starch according to the invention may come from any botanical origin. It may be a starch obtained by a physical, chemical or enzymatic treatment, a granular native starch of cereal plants such as wheat, maize, barley, triticale, sorghum or rice, tubers such as potato or cassava, or leguminous plants such as pea or soybean, and mixtures of such starches.

According to one preferred variant, this soluble starch is obtained from a starch that has undergone an acid, oxidizing or enzymatic hydrolysis, an oxidation, a chemical modification, especially an esterification and/or an etherification, acetylation, hydroxypropylation, cationization, crosslinking, phosphation or succinylation, or a treatment in an aqueous medium at low temperature (annealing treatment) or from a mixture of such starches.

It may be, in particular, a soluble starch obtained from a granular starch chosen from fluidized starches, oxidized starches, starches modified by a physicochemical route, white dextrins, and mixtures thereof.

It may finally be obtained from a starch modified by a combination of the treatments listed above or from any mixture of these native starches, starches modified by hydrolysis, starches modified by oxidation and starches modified by a physicochemical route. Preferably, the soluble starch is a derivative of native or modified wheat or pea starches.

The soluble starch according to the invention may be made soluble in particular by application of a pre-gelatinization on a drum, spray drying, hydrothermal cooking or chemical functionalization treatment.

This starch, which is soluble in water or organic solvents, is preferably a pregelatinized starch, a highly converted dextrin usually known as yellow dextrin, a maltodextrin, a highly functionalized starch or a mixture of these starches.

The pregelatinized starches may be obtained by hydrothermal treatment for gelatinization of native starches or of modified starches, in particular by steam cooking, jet-cooker cooking, cooking on drums, cooking in kneader-extruder systems then drying, for example in an oven, with hot air over a fluidized bed, on rotating drums, by spray drying, by extrusion or by freeze drying. Such starches usually have a solubility in demineralized water at 20° C. that is greater than 5% and more generally between 10 and 100%. By way of example, mention may be made of the products manufactured and sold by the applicant under the trade mark PREGEFLO®, having a water content of less than 10% and generally between 4 and 8%.

Dextrins may be prepared from native starches or modified starches, by dextrinification in a barely hydrated acid medium. They may be, in particular, soluble white dextrins or yellow dextrins. By way of example, mention may be made of the products STABILYS® A 053 or TACKIDEX® C072 manufactured and sold by the applicant. Such dextrins have, in demineralized water at 20° C., a solubility usually between 10 and 95%.

Maltodextrins may be obtained by acid, oxidizing or enzymatic hydrolysis of starches in an aqueous medium. They may have, in particular, a dextrose equivalent between 0.5 and 40, preferably between 0.5 and 20 and better still between 2 and 19. Such maltodextrins are, for example, manufactured and sold by the applicant under the trade name GLUCIDEX®. They have, in demineralized water at 20° C., a solubility generally greater than 90%, or even close to 100%.

The highly functionalized starches may be obtained from a native or modified starch. The high functionalization may, for example, be carried out by esterification or etherification at a sufficiently high level to make it soluble within the meaning defined above. Such functionalized starches have a solubility, at 20° C., greater than 5%, preferably greater than 10%, better still greater than 50% and ideally are completely soluble in demineralised water or else in an organic solvent such as, for example, in ethyl acetate, propyl acetate, butyl acetate, diethyl carbonate, propylene carbonate, dimethyl glutarate, triethyl citrate, dibasic esters (DBEs), dimethyl isosorbide, glycerol triacetate or isosorbide diacetate, isosorbide dioleate and plant oil methyl esters.

The high functionalization may be obtained, in particular, by acetylation in an acetic anhydride and acetic acid solvent phase, grafting by use, for example, of acid anhydrides, mixed anhydrides, fatty acid chlorides, oligomers of caprolactones or lactides, hydroxypropylation in the adhesive phase, cationization in the dry phase or adhesive phase, anionization in the dry phase or adhesive phase by phosphation or succinylation. These highly functionalized starches may be water-soluble and then have a degree of substitution between 0.1 and 3, and better still between 0.25 and 3.

In the case of organosoluble highly functionalized starches, such as acetates of starch, of dextrin or of maltodextrin, the degree of substitution is usually higher and greater than 0.1, preferably between 0.2 and 3, better still between 0.80 and 2.80 and ideally between 1.5 and 2.7.

Preferably, the reactants for modification or for functionalization of the starch are of renewable origin.

Preferably, the soluble starch has a low water content, of less than 10%, in particular less than 8%, better still less than 5% and ideally less than 2%, if possible less than 0.5%, or even less than 0.2%.

According to one advantageous variant, the soluble starch has a low content of reducing sugars, that is to say a dextrose equivalent (DE) of less than 0.5, preferably less than 0.2. This low content of reducing sugars may be obtained in a known manner by reduction of the soluble starch, for example by catalytic hydrogenation or by a treatment with sodium borohydride. Such hydrogenated or reduced soluble starches advantageously have a better heat stability.

According to one variant of the starch-based composition of the present invention, the soluble starch (a) is partially replaced by a plasticized starchy composition, constituted of starch and of a plasticizer thereof, and obtained by thermomechanical mixing of a granular starch chosen from native starches, fluidized starches, oxidized starches, starches that have undergone a chemical modification, white dextrins and mixtures of these starches and of a plasticizer of this granular starch.

The soluble starch may itself be plasticized by a plasticizer. The starch-based composition may therefore be any mixture of soluble and insoluble starch(es) and of plasticizer(s) thereof.

The plasticizer is preferably chosen from diols, triols and polyols such as glycerol, polyglycerols, isosorbide, sorbitans, sorbitol, mannitol, hydrogenated glucose syrups, salts of organic acids such as sodium lactate, methyl, ethyl or fatty esters of organic acids such as lactic, citric, succinic, adipic or glutaric acids, acetic or fatty esters of monoalcohols, diols, triols or polyols such as ethanol, diethylene glycol, glycerol or sorbitol, and mixtures of these products.

When the soluble starch is an organosoluble highly functionalized starch, the plasticizer is preferably chosen from methyl, ethyl or fatty esters of organic acids such as lactic, citric, succinic, adipic or glutaric acids, or acetic or fatty esters of monoalcohols, diols, triols or polyols such as ethanol, diethylene glycol, glycerol or sorbitol. By way of example, mention may be made of glycerol diacetate (diacetin), glycerol triacetate (triacetin), isosorbide diacetate, isosorbide dioctanoate, isosorbide dioleate and DBE.

The plasticizer advantageously has a molecular weight of less than 5000, preferably less than 1000, and in particular less than 400. The plasticizer preferably has a molecular weight greater than 18, in other words it preferably does not include water.

The plasticizer is incorporated into the starch preferably in a ratio by weight, on a dry basis, of plasticizer to soluble starch of between 1/100 and 150/100, preferably between 5/100 and 120/100 and better still between 10/100 and 60/100.

The amount of plasticizer used within the context of the invention may be zero or low, especially during the use of fluidized soluble starches, of dextrins or of maltodextrins.

The non-biodegradable, non-starchy polymer may be of any nature and may be a blend of polymers.

It is advantageously a functional polymer bearing functional groups having an active hydrogen and/or functional groups that give, especially via hydrolysis, such functional groups having an active hydrogen.

It may be synthetic polymers obtained from monomers of fossil origin but also, and preferably, monomers of biological origin (biosourced monomers). These synthetic polymers are preferably of the polyolefin, polystyrene, polyvinyl, polyacrylic, fluoro, polyacetal, polyester, polycarbonate, polyether, polyamide, polyimide, polyurethane, polysulfone, silicone and epoxy type.

This non-biodegradable, non-starchy polymer may be chosen from synthetic polymers of polyester, polyacrylic, polyacetal, polycarbonate, polyamide, polyimide, polyurethane, functionalized polyolefin, functionalized styrene, functionalized vinyl, functionalized fluoro, functionalized polysulfone, functionalized polyphenylene ether, functionalized polyphenylene sulfide, functionalized silicone and functionalized polyether type.

By way of example, mention may be made of PETs, polyamides PA-6, PA-6,6, PA-6,10, PA-6,12, PA-11 and PA-12, polyacrylates, polyvinyl acetates, ethylene/vinyl acetates (EVAs), ethylene/methyl acrylate copolymers (EMAs), ethylene/vinyl alcohol copolymers (EVOHs), polyoxymethylenes (POMs), acrylonitrile-styrene-acrylate copolymers (ASAs), thermoplastic polyurethanes (TPUs), polyethylenes or polypropylenes that are functionalized, for example, by silane, acrylic or maleic anhydride units and styrene-ethylene-butylene-styrene (SEBS) block copolymers functionalized, for example, with maleic anhydride units and mixtures of these polymers.

The non-biodegradable, non-starchy polymer, which is preferably functionalized, is advantageously a polymer that is synthesized or functionalized, partially or completely, by using biosourced monomers, that is to say monomers derived from short-term renewable natural resources such as plants, microorganisms or gases, especially from sugars, glycerol, oils or derivatives thereof such as alcohols or acids, which are monofunctional, difunctional or polyfunctional.

It may especially be polyethylene derived from bio-ethanol, polypropylene derived from bio-propanediol, non-biodegradable polyesters based on biosourced lactic acid or succinic acid, non-biodegradable polyesters based on biosourced butanediol, isosorbide or succinic acid, polyesters of SORONA® type based on biosourced 1,3-propanediol, polycarbonates containing isosorbide, polyethylene glycols based on bio-ethylene glycol, polyamides based on castor oil or on plant polyols, and polyurethanes based on diols or diacids derived from plant or animal fatty substances, glycerol, isosorbide, sorbitol or saccharose.

The non-biodegradable, non-starchy polymer may also be chosen from polymers of natural origin obtained directly by extraction from plants, algae, microorganisms or animal tissues and modified or functionalized in order to lose their biodegradability. These may be, in particular, protein, cellulose or lignocellulose polymers, or polymers of chitosan and natural rubber type.

Such a modified or functionalized, non-biodegradable, non-starchy polymer may be chosen from flours, modified proteins, celluloses that are modified in particular by carboxymethylation, ethoxylation, hydroxypropylation, cationization, acetylation or alkylation, hemicelluloses, lignins and modified guars, chitins and chitosans, natural resins and gums such as natural rubbers, rosins, shellacs and terpene resins, polysaccharides extracted from algae such as alginates and carrageenans, polysaccharides of bacterial origin such as modified xanthans or modified PHAs, lignocellulosic fibers such as flax, hemp, sisal, coir or miscanthus fibers.

Preferably, the non-biodegradable, non-starchy polymer is chosen from ethylene/vinyl acetate copolymers (EVAs), polyethylenes (PEs) and polypropylenes (PPs), polyethylenes (PEs) and polypropylenes (PPs) that are functionalized with silane, acrylic or maleic anhydride units, thermoplastic polyurethanes (TPUs), styrene-ethylene-butylene-styrene block copolymers (SEBSs) that are functionalized with maleic anhydride units, synthetic polymers obtained from biosourced monomers, and modified or functionalized polymers extracted from natural resources (secretion or extracts from plants, animal tissues and microorganisms), and mixtures thereof.

Mention may be made, as particularly preferred examples of non-biodegradable, non-starchy polymers that can be used in the present invention, of polyethylenes (PEs) and polypropylenes (PPs), preferably that are functionalized, thermoplastic polyurethanes, polyamides, triblock styrene-ethylene-butylene-styrene block copolymers (SEBSs) and amorphous polyethylene terephthalates (PETGs).

Advantageously, the non-biodegradable, non-starchy polymer has a weight-average molecular weight between 8500 and 10 000 000 daltons, in particular between 15 000 and 1 000 000 daltons.

The starch-based composition according to the invention may also comprise various other additional products. These may be products that aim to improve its physicochemical properties, in particular its processing behavior and its durability or else its mechanical, thermal, conductive, adhesive or organoleptic properties.

The additional product may be an agent that improves or adjusts mechanical or thermal properties chosen from minerals, salts and organic substances, in particular from nucleating agents such as talc, compatibilizing agents such as surfactants, agents that improve the impact strength or scratch resistance such as calcium silicate, shrinkage control agents such as magnesium silicate, agents that trap or deactivate water, acids, catalysts, metals, oxygen, infrared radiation or UV radiation, hydrophobic agents such as oils and fats, hygroscopic agents such as pentaerythritol, flame retardants and fire retardants such as halogenated derivatives, anti-smoke agents, mineral or organic reinforcing fillers, such as clays, carbon black, talc, plant fibers, glass fibers, polyacrylonitrile or kevlar.

The additional product may also be an agent that improves or adjusts conductive or insulating properties with respect to electricity or heat, impermeability for example to air, water, gases, solvents, fatty substances, gasolines, aromas and fragrances, chosen, in particular, from minerals, salts and organic substances, in particular from nucleating agents such as talc, compatibilizing agents such as surfactants, agents which trap or deactivate water, acids, catalysts, metals, oxygen or infrared radiation, hydrophobic agents such as oils and fats, beading agents, hygroscopic agents such as pentaerythritol, agents for conducting or dissipating heat such as metallic powders, graphites and salts, and micrometric reinforcing fillers such as clays and carbon black.

The additional product may also be an agent that improves organoleptic properties, in particular:
- odorant properties (fragrances or odor-masking agents);
- optical properties (brighteners, whiteners, such as titanium dioxide, dyes, pigments, dye enhancers, opacifiers, mattifying agents such as calcium carbonate, thermochromic agents, phosphorescence and fluorescence agents, metallizing or marbling agents and antifogging agents);
- sound properties (barium sulfate and barytes); and
- tactile properties (fatty substances).

The additional product may also be an agent that improves or adjusts adhesive properties, especially adhesion with respect to cellulose materials such as paper or wood, metallic materials such as aluminum and steel, glass or ceramic materials, textile materials and mineral materials, especially pine resins, rosin, ethylene/vinyl alcohol copolymers, fatty amines, lubricants, demolding agents, antistatic agents and antiblocking agents.

Finally, the additional product may be an agent that improves the durability of the material or an agent that controls its (bio)degradability, especially chosen from hydrophobic agents such as oils and fats, anticorrosion agents, antimicrobial agents such as Ag, Cu and Zn, degradation catalysts such as oxo catalysts and enzymes such as amylases.

The incorporation of the coupling agent into the thermoplastic composition and the reaction with the starch and/or the functional polymer is preferably carried out by hot kneading at a temperature between 60 and 200° C., and better still from 100 to 160° C.

Preferably, the thermomechanical mixing of the soluble starch and of the optional plasticizer is carried out hot, at a temperature preferably between 60 and 200° C., more preferably between 100 and 160° C., in a batchwise manner, for example by dough mixing/kneading, or continuously, for example by extrusion. The duration of this mixing may range from a few seconds to a few hours, depending on the mixing method used.

Similarly, the incorporation, during step (ii) or step (iii), of the non-starchy polymer or of the coupling agent into the composition may be carried out by thermomechanical mixing, in a batchwise manner or continuously and in particular in-line, by reactive extrusion. In this case, the mixing time may be short, from a few seconds to a few minutes.

As explained previously, the invention targets both the starch-based composition capable of being obtained according to the method before reaction by heating and the thermoplastic composition capable of being obtained after reaction by heating.

Of course, the most advantageous properties of the thermoplastic compositions of the present invention are those of the compositions obtained after heating at a sufficient temperature in order to react the coupling agent with the starch and/or with the non-starchy polymer.

The applicant has observed that the thermoplastic starchy compositions according to the invention have a lower sensitivity to water than the plasticized starches of the prior art. The latter, which are very sensitive to water, must necessarily be cooled in air, which requires much more time than cooling in water. Furthermore, this characteristic of stability to water opens up many new potential uses for the thermoplastic starchy composition according to the invention.

The composition in accordance with the invention is thermoplastic within the meaning defined above and therefore advantageously has a complex viscosity, measured on a rheometer of PHYSICA MCR 501 type or equivalent, between 10 and $10^6$ Pa·s, for a temperature between 100 and 200° C. For injection molding uses, for example, its viscosity at these temperatures may be rather low and the composition is then preferably thermofusible within the meaning specified above.

These thermoplastic compositions according to the invention have the advantage of being not very soluble or preferably insoluble in water, of hydrating with difficulty and of retaining good physical integrity after immersion in water. Their insolubles content after 24 hours in water at 20° C. is preferably greater than 72%, in particular greater than 80%, better still greater than 90%. Very advantageously, it may be greater than 92%, especially greater than 95%. Ideally, this insolubles content may be at least equal to 98% and especially be close to 100%.

Furthermore, the degree of swelling of the thermoplastic compositions according to the invention, after immersion in water at 20° C. for a duration of 24 hours, is preferably less than 20%, in particular less than 12%, better still less than 6%. Very advantageously, it may be less than 5%, especially less than 3%. Ideally, this degree of swelling is at most equal to 2% and may especially be close to 0%.

Unlike the compositions of the prior art with high contents of thermoplastic starch, the thermoplastic composition according to the invention advantageously has stress/strain curves that are characteristic of a ductile material, and not of a brittle material. The elongation at break, measured for the compositions of the present invention, is greater than 40%, preferably greater than 80%, better still greater than 100%. This elongation at break may advantageously be at least equal to 95%, especially at least equal to 120%. It may even attain or exceed 180%, or even 250%. In general, it is reasonably below 500%.

The maximum tensile strength of the compositions of the present invention is generally greater than 4 MPa, preferably greater than 6 MPa, better still greater than 10 MPa. It may even attain or exceed 15 MPa, or even 20 MPa. In general, it is reasonably below 80 MPa.

The thermoplastic composition of the present invention also has the advantage of being constituted of essentially renewable raw materials (soluble starch) and of exhibiting, after adjustment of the formulation, the following properties, that are of use in multiple plastics processing applications or in other fields:
- suitable thermoplasticity, melt viscosity and glass transition temperature, within the standard value ranges known for common polymers ($T_g$ of from −50° to 150° C.), allowing implementation by virtue of existing industrial installations that are conventionally used for standard synthetic polymers;
- sufficient miscibility with a wide variety of polymers of fossil origin or of renewable origin that are on the market or in development;
- satisfactory physicochemical stability for the usage conditions;
- low sensitivity to water and to steam;
- mechanical performances that are very significantly improved compared to the thermoplastic starch compositions of the prior art (flexibility, elongation at break, maximum tensile strength);
- good barrier effect to water, to steam, to oxygen, to carbon dioxide, to UV radiation, to fatty substances, to aromas, to gasolines, to fuels;

opacity, translucency or transparency that can be adjusted as a function of the uses;
good printability and ability to be painted, especially by aqueous-phase inks and paints;
controllable shrinkage;
stability over sufficient time; and
adjustable recyclability.

Quite remarkably, the starch-based thermoplastic composition of the invention may, in particular, simultaneously have:
an insolubles content at least equal to 98%;
an elongation at break at least equal to 100% and preferably at least equal to 200%; and
a maximum tensile strength of greater than 10 MPa.

The thermoplastic composition according to the invention may be used as is or as a blend with synthetic polymers, artificial polymers or polymers of natural origin, which are biodegradable or non-biodegradable.

The composition according to the invention is preferably non-biodegradable or non-compostable within the meaning of the EN 13432, ASTM D6400 and ASTM 6868 standards, and then comprises, for example, known synthetic polymers or starches or extracted polymers that are highly functionalized, crosslinked or etherified. It is possible to adjust the service life and the stability of the composition in accordance with the invention by adjusting, in particular, its affinity for water, so as to be suitable for the expected uses as material and for the methods of reuse envisaged at the end of life.

The composition according to the invention usually contains at least 33%, preferably at least 50%, in particular at least 60%, better still at least 70%, or even more than 80% of carbon of renewable origin within the meaning of ASTM D6852 standard relative to the total carbon content of the composition. This carbon of renewable origin is essentially that constituent of the starch inevitably present in the composition according to the invention but may also advantageously, via a judicious choice of the constituents of the composition, be that present in the plasticizer of the starch as in the case, for example, of glycerol or sorbitol, but also of that present in the non-starchy polymer(s) or any other constituent of the thermoplastic composition, when they originate from renewable natural resources such as those preferentially defined above.

In particular, it can be envisaged to use the starch-based thermoplastic compositions according to the invention as barrier films to oxygen, to carbon dioxide, to aromas, to fuels and/or to fatty substances, alone or in multilayer structures obtained by coextrusion, for the field of food packaging in particular.

The compositions of the present invention may also be used to increase the hydrophilic nature, the aptitude for electrical conduction, the water and/or steam permeability, or the resistance to organic solvents and/or fuels, of synthetic polymers within the context, for example, of the manufacture of membranes, of films or of printable electronic labels, of textile fibers, of containers or tanks, or else of improving the adhesive properties of synthetic thermofusible films on hydrophilic supports.

It should be noted that the hydrophilic nature of the thermoplastic composition according to the invention considerably reduces the risks of bioaccumulation in the adipose tissues of living organisms and therefore also in the food chain.

The composition according to the invention may be in pulverulent form, granular form or in the form of beads and may constitute the matrix of a masterbatch that can be diluted in a biosourced or non-biosourced matrix.

The invention also relates to a plastic or elastomeric material comprising the thermoplastic composition of the present invention or a finished or semi-finished product obtained from this composition.

EXAMPLES

Comparison of Starchy Compositions Based on Water-Soluble Maltodextrins According to the Prior Art (without Coupling Agent) and According to the Invention (with Coupling Agent)

Used for these examples are:
as soluble starches, various maltodextrins sold by the applicant under the names GLUCIDEX 1, GLUCIDEX 2, GLUCIDEX 6, GLUCIDEX 12 and GLUCIDEX 19, having a water content of around 4%. These maltodextrins have a soluble fraction in water at 20° C. of close to 100%;
as non-biodegradable, non-starchy polymer, a thermoplastic polyurethane (TPU) sold by Lubrisol under the name ESTANE 58300; and
as coupling agent, methylene diphenyl diisocyanate (MDI) sold under the name Suprasec 1400 by Huntsman.

A twin-screw extruder of TSA brand (diameter (D) of 26 mm, length of 56D) is fed with a 50/50 maltodextrin (not dried)/TPU mixture at a total material throughput of 15 kg/h.

The extrusion conditions are the following:
temperature profile (ten heating zones Z1 to Z10): 160° C.;
screw speed: 400 rpm.

At the outlet of the extruder, it is observed in all cases that the compositions obtained under these conditions are weakly hydrophilic and can be cooled in a tank of cold water although they then become slightly tacky at the surface.

In order to eliminate this surface tackiness, the extruded and cooled rods are dried at 80° C. in an oven under vacuum for 24 hours, and are then granulated.

These granulated starchy compositions are subjected to a second extrusion, under the same conditions as before:
either in the absence of coupling agent (comparative compositions);
or in the presence of 1 part of MDI per 100 parts of granules (phr) (compositions according to the invention).

Water Stability Tests:

Tests were carried out to measure the sensitivity to water and to steam of these same compositions. These tests make it possible to evaluate, quite precisely, the hydrophilic or hydrophobic nature of the compositions thus prepared.

Water Uptake Test:

The degree of water uptake is determined by measuring the mass of the comparative compositions and of the compositions according to the invention above, after being stored for one month, before drying ($M_h$) and after drying under vacuum at 80° C. for 24 hours ($M_s$). The moisture content (expressed in percent) is calculated from the following equation:

$$\text{Moisture content}(\%) = (1 - M_s/M_h) \times 100.$$

Content of Insolubles and Degree of Swelling:

The content of insolubles and the degree of swelling in water of the compositions obtained is determined according to the following protocol:
(i) drying the sample to be characterized (12 hours at 80° C. under vacuum);
(ii) measuring the mass of the sample (=Ms1) with a precision balance;

(iii) immersing the sample in water, at 20° C. (volume of water in ml equal to 100 times the mass in g of sample);
(iv) removing the sample after a defined time of several hours;
(v) removing the excess water at the surface with absorbent paper, as rapidly as possible;
(vi) placing the sample on a precision balance and monitoring the loss of mass over 2 minutes (measuring the mass every 20 seconds);
(vii) determining the mass of the swollen sample via graphical representation of the preceding measurements as a function of the time and extrapolation to t=0 of the mass (=Mg);
(viii) drying the sample (for 24 hours at 80° C. under vacuum). Measuring the mass of the dry sample (=Ms2);
(ix) calculating the insolubles content, expressed in percent, according to the equation Ms2/Ms1; and
(x) calculating the degree of swelling, in percent, according to the equation (Mg−Ms1)/Ms1.

The results obtained are summarized in table 1 below.

TABLE 1

Degree of moisture uptake and content of insolubles measured for GLUCIDEX ®/TPU 58300 compositions

| Test No. | TPU | Soluble starchy material | Dry TPU/starchy material ratio | MDI (phr) | Degree of water uptake (%) | Content of insolubles (%) |
|---|---|---|---|---|---|---|
| 7605 | 58300 | Glucidex 19 | 50/50 | 0 | 3.1 | 69 |
|  |  |  |  | 1 | 2.9 | 95 |
| 7606 | 58300 | Glucidex 12 | 50/50 | 0 | 3.1 | 75 |
|  |  |  |  | 1 | 3.1 | 99 |
| 7607 | 58300 | Glucidex 6 | 50/50 | 0 | 3.8 | 75 |
|  |  |  |  | 1 | 3.5 | 98 |
| 7608 | 58300 | Glucidex 2 | 50/50 | 0 | 3.9 | 68 |
|  |  |  |  | 1 | 3.4 | 99 |
| 7609 | 58300 | Glucidex 1 | 50/50 | 0 | 4.0 | 77 |
|  |  |  |  | 1 | 3.6 | 97 |

It is observed that the GLUCIDEX/TPU 58300 compositions according to the invention containing 1 phr of MDI (results in bold) are practically insoluble in water (content of insolubles greater than 95%) and hydrophobic, whereas the compositions according to the prior art, which are free of MDI, are very hydrophilic and disintegrate.

Mechanical Properties:

The mechanical properties in tension of the various samples are determined according to the NF T51-034 standard (determination of the tensile properties) using a Lloyd Instruments LR5K test bench, a pull rate of 300 mm/min and standardized test specimens of H2 type.

TABLE 2

Tensile strength and elongation at break of the GLUCIDEX ®/TPU 58300 compositions

| Test No. | TPU | Soluble starchy material | TPU/starchy material ratio | MDI (phr) | Strength (MPa) | Elongation (%) |
|---|---|---|---|---|---|---|
| 7605 | 58300 | Glucidex 19 | 50/50 | 0 | 10 | 740 |
|  |  |  |  | 1 | 15 | 376 |
| 7606 | 58300 | Glucidex 12 | 50/50 | 0 | 9 | 170 |
|  |  |  |  | 1 | 15 | 255 |
| 7607 | 58300 | Glucidex 6 | 50/50 | 0 | 8 | 480 |
|  |  |  |  | 1 | 11 | 213 |
| 7608 | 58300 | Glucidex 2 | 50/50 | 0 | 10 | 50 |
|  |  |  |  | 1 | 14 | 207 |
| 7609 | 58300 | Glucidex 1 | 50/50 | 0 | 7 | 160 |
|  |  |  |  | 1 | 14 | 215 |

These results show that the use of a difunctional coupling agent (MDI) leads to an increase in the tensile strengths of around 50% compared to the corresponding MDI-free compositions. The elongations at break of all the compositions prepared in the presence of MDI are greater than 200%. These values are equivalent to those obtained with low-density polyethylenes.

Analysis by mass spectrometry moreover showed that the compositions thus prepared in accordance with the invention with use of a coupling agent (MDI), contain specific entities attesting to the bonding, with each other, of the starchy chains contained in the maltodextrin used, via the coupling agent.

The use of the maltodextrins Glucidex 12 and Glucidex gives starchy compositions that have particularly advantageous mechanical properties. These two maltodextrins have weight-average molecular weights between 800 and 1600, lower than the three other dextrins, which lie between 3000 and 20 000.

These results clearly show the very beneficial effect of using a coupling agent during the preparation of a thermoplastic composition based on a soluble starchy material such as a maltodextrin, in terms of improvement of the stability to moisture and to water and of improvement of the mechanical properties.

The invention claimed is:

1. A starch-based composition comprising:
   (a) at least 45% by weight of a soluble starch;
   (b) between 0.1% and 49% by weight of a non-biodegradable, non-starchy polymer; and
   (c) a coupling agent bearing at least two functional groups capable of reacting with molecules bearing functional groups having an active hydrogen,
   these amounts being expressed as dry matter and related to the sum of (a) and (b), and
   wherein said soluble starch is a maltodextrin having a DE between 0.5 and 19, said non-biodegradable, non-starch polymer is a thermoplastic polyurethane, and said coupling agent is a diisocyanate.

2. The composition as claimed in claim 1, further comprising a plasticizer selected from the group consisting of glycerol, polyglycerols, isosorbide, sorbitans, sorbitol, mannitol, hydrogenated glucose syrups, sodium lactate, methyl, ethyl or fatty esters of organic acids, acetic or fatty esters of monoalcohols, diols, triols or polyols, and mixtures thereof.

3. The composition as claimed in claim 2, wherein the weight ratio of the plasticizer to the soluble starch is between 1/100 and 150/100.

4. The composition as claimed in claim 1, wherein the amount of soluble starch (a), expressed as dry matter and related to the sum of (a) and (b), is between 51% and 99.8% by weight.

5. The composition as claimed in claim 1, wherein the coupling agent is selected from the group consisting of 4,4'-dicyclohexylmethane diisocyanate (H12MDI), methylene diphenyl diisocyanate (MDI), toluene diisocyanate (TDI), naphthalene diisocyanate (NDI), hexamethylene diisocyanate (HMDI) and lysine diisocyanate (LDI).

6. The composition as claimed in claim 5, wherein the coupling agent is methylene diphenyl diisocyanate.

7. The composition as claimed in claim 1, wherein the amount of coupling agent, expressed as dry matter and related to the sum of (a) and (b), is between 0.1 and 15% by weight.

8. The composition as claimed in claim 1, wherein the composition contains at least 33% of carbon of renewable origin within the meaning of the ASTM D6852 standard.

* * * * *